US009848452B2

United States Patent
Singh et al.

(10) Patent No.: US 9,848,452 B2
(45) Date of Patent: Dec. 19, 2017

(54) TECHNIQUES FOR ALLOCATING SHORT ADDRESSES TO NETWORK DEVICES

(71) Applicant: Landis+Gyr Innovations, Inc., Alpharetta, GA (US)

(72) Inventors: Shobhit Kumar Singh, Ghaziabad (IN); Saurabh Jain, Ghaziabad (IN); Ankush Sabharwal, New Delhi (IN)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 72 days.

(21) Appl. No.: 15/134,484

(22) Filed: Apr. 21, 2016

(65) Prior Publication Data

US 2017/0311360 A1    Oct. 26, 2017

(51) Int. Cl.
*G08C 17/00* (2006.01)
*H04W 76/02* (2009.01)
(Continued)

(52) U.S. Cl.
CPC ......... *H04W 76/021* (2013.01); *H04L 5/0055* (2013.01); *H04W 4/008* (2013.01); *H04W 52/0212* (2013.01); *H04W 72/0453* (2013.01); *H04W 72/0473* (2013.01); *H04W 88/12* (2013.01)

(58) Field of Classification Search
CPC ............... H04W 76/021; H04W 4/008; H04W 72/0473; H04W 52/0212; H04W 72/0453; H04W 88/12; H04L 5/0055
See application file for complete search history.

(56) References Cited

U.S. PATENT DOCUMENTS

| 2015/0127733 A1* | 5/2015 | Ding ................. H04W 4/08 709/204 |
| 2015/0245287 A1* | 8/2015 | Shudark ............ H04W 52/0206 370/311 |

(Continued)

FOREIGN PATENT DOCUMENTS

WO    2015006636    1/2015

OTHER PUBLICATIONS

Kang et al., "IEEE 802.15-08-409-04-004e; Time Slotted, Channel Hopping MAC Proposal", Jul. 2008, 33 pages.

(Continued)

*Primary Examiner* — Clemence Han
(74) *Attorney, Agent, or Firm* — Kilpatrick Townsend & Stockton LLP

(57) ABSTRACT

Disclosed are various embodiments for assigning a short address to a node in a network. A first node receives an association request that is a request from a second node to join the network. The first node transmits an association response to the second node, whereby the association response permits the second node to conditionally join the network and enter a low-power state. Data from the association request is transmitted to a coordinator node for the network on behalf of the second node. The first node receives a proxy response from the coordinator node in response to the data from the association request. When the second node is active, a notification is transmitted to the second node based on the response to the request. The notification includes an assignment of a short address when the response indicates the second node has joined the network.

20 Claims, 5 Drawing Sheets

(51) Int. Cl.
*H04W 52/02* (2009.01)
*H04W 72/04* (2009.01)
*H04W 4/00* (2009.01)
*H04L 5/00* (2006.01)
*H04W 88/12* (2009.01)

(56) References Cited

U.S. PATENT DOCUMENTS

| | | | |
|---|---|---|---|
| 2016/0037449 A1* | 2/2016 | Kandhalu Raghu | H04W 52/0209 370/311 |
| 2016/0072548 A1* | 3/2016 | Shih | H04B 1/7143 375/134 |
| 2016/0174148 A1* | 6/2016 | Seed | H04W 52/0216 370/311 |
| 2016/0269972 A1* | 9/2016 | Taneja | H04W 40/246 |

OTHER PUBLICATIONS

PCT/US2017/024290, "International Search Report and Written Opinion", dated Jun. 13, 2017, 13 pages.

* cited by examiner

TECHNIQUES FOR ALLOCATING SHORT ADDRESSES TO NETWORK DEVICES

BACKGROUND

In some Time Synchronous Channel Hopping (TSCH) networks, such as that defined by IEEE 802.15.4e, network communication among nodes of the mesh network can be carried out using the "extended addresses" of the nodes and/or using "short addresses" of the nodes. In order to conserve available bandwidth and reduce power consumption, it is preferable for nodes to communicate using their short addresses. Typically, a node is assigned its short address when it joins the network. However, a significant amount of time may elapse from the time a node requests to join the network until the node receives a response that indicates whether it has successfully joined the network. In order to avoid missing the response, nodes must be maintained in an active state until the response is received. For a battery-powered node, the potentially extensive time spent waiting for a response while in an active state can consume a substantial amount of energy from the battery.

SUMMARY

Various aspects of the present invention relate to a first node assigning a short address to a second node in a time synchronous network. In one aspect, the first node receives an association request that is a request from a second node to join the network. The network may be a TSCH network, such as defined by IEEE 802.15.4e. The first node transmits an association response to the second node, where the association response permits the second node to conditionally join the network and enter a low-power state, and the association response instructs the second node to be in an active state during a specified period. By entering a low-power state, energy consumption can be conserved in the second node, which may be battery-powered.

Additionally, the first node transmits data from the association request to a coordinator node for the network on behalf of the second node. Thereafter, the first node receives a proxy response from the coordinator node in response to the data from the association request. The proxy response includes a response to the request from the second node to join the network. Subsequent to the first node receiving the proxy response and during the period in which the second node is instructed to be in the active state, the first node transmits a notification to the second node based on the response from the coordinator node. When the response indicates that the second node has successfully joined the network, the notification includes an assignment of a short address for the second node. The notification includes a disconnect notification for the node when the response indicates that the node has failed to join the network. The disconnect notification ends the conditional join to the network.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
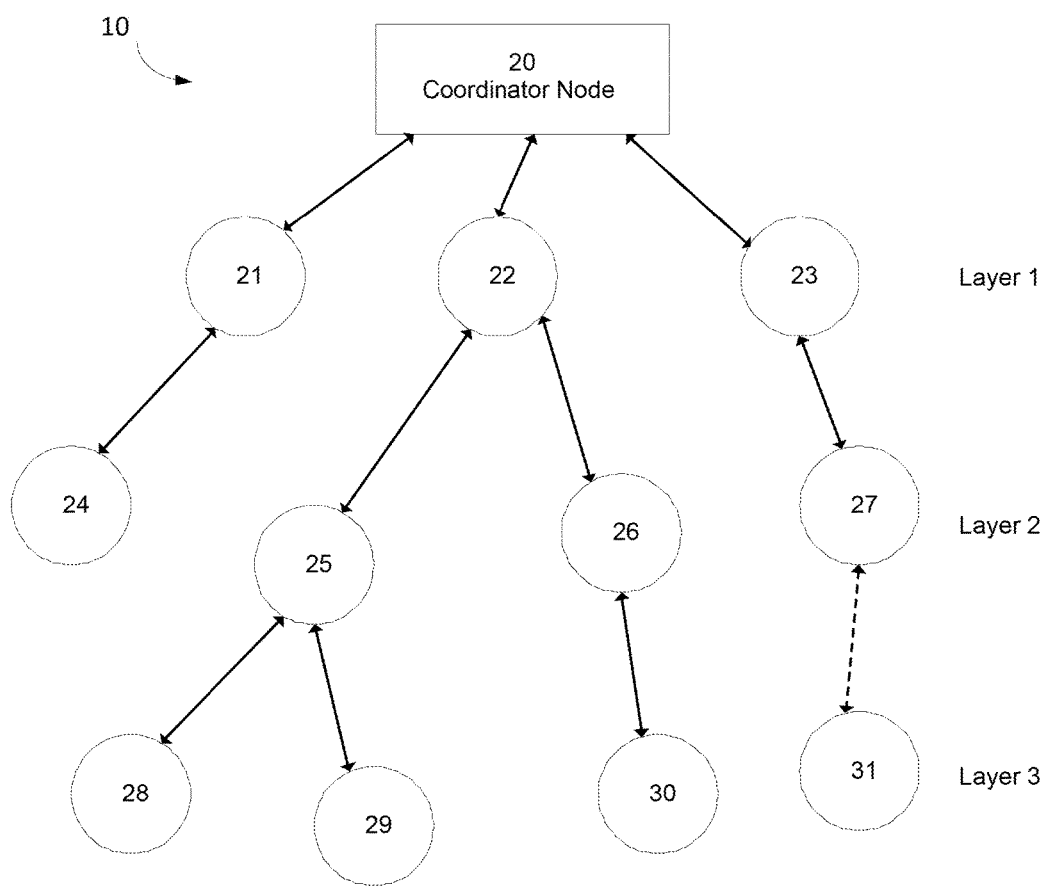
FIG. 1 is a drawing of a mesh network according to various embodiments of the present disclosure.

The techniques disclosed herein are directed to reducing the amount of time that battery-powered nodes and possibly other types of nodes must spend in an active state in order to join a mesh network and be assigned a short address. For example, in TSCH networks, such as defined by IEEE 802.15.4e, each node can acquire or identify other nodes with which it can communicate (commonly referred to as neighboring nodes), and obtain certain information and performance metrics about these nodes to facilitate communication. Nodes can use the metrics to score each of the nodes they identified to determine which identified node provides the best option for sending information to a destination and for receiving messages, i.e., a parent node. A node that has identified a parent node may be synonymously be referred to as a child node of the parent node.

Network communication among nodes of the network can be carried out using the extended addresses of the nodes and/or using short addresses of the nodes. In order to conserve available bandwidth and reduce power consumption, it is preferable for nodes to communicate using their short addresses. Typically, a node is assigned its short address once it has joined the network. However, a significant amount of time may elapse from the time a node requests to join the network (also referred to as an "association request") until the node receives a response that indicates whether it has successfully joined the network (also referred to as an "association response"). If the association response indicates the node has successfully joined the network, it may further include the short address assigned to the node by the coordinator node for the network (also referred to as a "collector" node). In order to avoid missing the association response, a requesting node must be maintained in an active state until the response is received. For a battery-powered node, the potentially extensive time spent waiting for the association response while in an active state can consume a substantial amount of energy from the battery.

In order to reduce the time spent waiting for the response, implementations herein emphasize a parent node for the node promptly sending an association response to a node's association request. This association response from the parent node functions to permit a node to conditionally join the mesh network, thereby allowing the node to enter a low-power state (also referred to as a "sleep" state) shortly afterward. Once in the sleep state, the node will periodically wake to an active state for a "scheduled sync" during which the node may send/receive data before again entering a sleep state. Meanwhile, once the parent node receives the association request from the node, it acts as a proxy by forwarding data from the association request to the coordinator node for the mesh network on behalf of the child node. Due to inherent delays and/or retransmissions that may occur, particularly within mesh networks, considerable time may pass until the parent node receives a response from the coordinator that either accepts or rejects the node's association request. The parent node will notify the node of the response during the next schedule sync event or, if sooner, using the next packet sent to the node while the node is in its active state. In the event the node's request to join the network is approved, a short address is included in the response which the parent node sends to the node for use on the network. In the event the node's request to join the network is denied, the parent node sends a disconnect notification to the node.

As defined herein, a "node" includes an intelligent device capable of performing functions related to distributing messages in a mesh network. In one system, a node can be a meter located at a premises, such as a house or apartment, that measures the consumption of a utility such as gas, water, or electric power. Such a meter can be part of an advanced metering infrastructure (AMI), radio frequency (RF) network. Other examples of nodes include a router, coordinator or collector, host computer, hub, or other electronic device that is attached to a network and is capable of sending, receiving, or forwarding information over a communications channel. A coordinator node may facilitate establishing a mesh network that may also be referred to as a personal area network (PAN) or a wireless PAN (WPAN).

A node can contain several components that enable it to function within implementations of the present invention. For example, a node can include a radio that can enable it to communicate with like nodes and/or other devices in the mesh network. The radio of each node may have a programmable logic controller (PLC)-like device (e.g., a microcontroller) that can enable the radio to function like a computer, carrying out computer and command functions to provide implementations of the present invention described herein. A node may also include a storage medium for storing information related to communication with other nodes. Such storage mediums can include a memory, a disk, CD-ROM, DVD, or other storage devices located internal to the node or accessible by the node via a network, for example. A node may also include a crystal oscillator (i.e. a clock) to provide time-keeping and a battery to provide back-up power. Some nodes may be powered only by a battery and may also be referred to as battery-powered nodes.

A node can communicate with other nodes in the mesh network over various frequency channels. Nodes that share the same frequency hopping sequence, i.e., hop between frequencies at the same time, can communicate with each other over the same frequency. Thus, in a TSCH network, nodes can hop at different times to establish communication with other nodes over the available frequency spectrum, e.g., 240 channels according to exemplary implementations. A node can hop according to a certain time increment or dwell time, e.g., 400 milliseconds, at which time the node can transmit or receive a message over a given channel or frequency. The channels described herein can exist within the 240 channel frequency range, for example, and can be separated by guard bands which can represent the "space" between frequency channels. Thus, according to an exemplary implementation, 240 separate communications can occur simultaneously in the mesh network, each communication occurring on a separate channel. Such communications can utilize the entire bandwidth of the 240 channel network.

As used herein, an "extended address" refers to a media access control (MAC) network address for a node with which the node may use to send and/or receive data to/from other nodes. In some embodiments of a network defined by IEEE 802.15.4e, the extended address may be an 8-byte hardware MAC address.

As used herein, a "short address" refers to a dynamically-assigned network address for a node that is shorter than an extended address and with which the node may also use to send and/or receive data to/from other nodes. In some embodiments of a network defined by IEEE 802.15.4e, the short address may be a 2-byte address dynamically-assigned to a node by the network which the node has joined. Depending upon the implementation, the short address for a node may or may not be derived from the extended address for the node.

As used herein, a "conditional join" to a network refers to permitting a node to join the network pending a definitive determination of the node's request to join the network by an authoritative source, such as a collector node for the network. If the request to join the network is ultimately approved, the node can remain in the network or can simply be said to have joined the network. If the request to join the network is ultimately denied, the node disconnects from the network. It should be noted that the conditional status may only be recognized from the perspective of the parent node whose child node has requested to join the network; the child node may not receive an indication that a conditional join to the network has any conditions attached. However, in some implementations, a node that has conditionally joined the network can only communicate with a parent node and may not perform other network functions (e.g., sending beacon messages) until the conditional join is confirmed by the coordinator node.

Referring now to the drawings, FIG. 1 depicts an exemplary mesh network 10 configured to implement systems described herein. The mesh network 10 can include a coordinator node 20 and radio nodes 21-30. The coordinator node 20 can serve as a collection point to which the nodes 21-30 may send information, such as measurements of the consumption of gas, water, or electric power at a facility associated with the node. Nodes 21-30, as previously discussed, can have sufficient networking and computing capability to communicate with other nodes in the mesh network and to make intelligent determinations to facilitate such communication. The coordinator node can be configured to have at least the same functionality and capabilities present in nodes 21-30. Additionally, the coordinator node 20 may include sufficient storage capability for storing information from nodes 21-30 and, in some examples, greater computing capability to process the information received from the nodes. In other examples, a command center or other computing device (not shown) can be used to process the information received from the nodes.

Three layers of nodes in the mesh network 10 are shown in FIG. 1 (layer 1, layer 2, and layer 3). Fewer or more layers may exist in other configurations. Nodes can be associated with a particular layer based on certain factors, such as a node's logical distance to the coordinator node 20 and the reliability of its data transmissions. The factors and/or the weights given to the factors may vary with different networks. Nodes located on layer 1 indicate that they have a "better" connection to the coordinator node 20, and do not require the use of an intervening node to communicate with the coordinator node 20. Nodes located on higher numbered layers communicate with the coordinator node 20 through at least one intervening node. For example, nodes located on layer 2 are child nodes to a layer 1 parent node, and nodes located on layer 3 are child nodes to a layer 2 parent node (i.e. here, layer 2 nodes can serve both parent and child roles in different node pairings). Thus, a layer 3 node communicates with the coordinator node through its parent layer 2 node, which in turn communicates with its parent layer 1 node, which communicates with the collector. While FIG. 1 shows layer 1 nodes being closer to the coordinator node 20 than layer 2 nodes, and layer 2 nodes closer than layer 3 nodes, the layers may not be determined solely by physical distance. A layer 1 node may be located further away from the coordinator node 20 than a layer 2 node, depending upon the manner in which the nodes are evaluated. It should be noted that the connections among nodes are dynamic and subject to change.

As shown in FIG. 1, nodes 21-30 are currently joined to the mesh network 10, as indicated by the solid lines joining the nodes 21-30. A battery-powered node, node 31, is attempting to join the mesh network via node 27, as indicated by the dashed line between node 31 and node 27. In this configuration, the node 27 can be referred to as the parent node to node 31, while node 31 can be referred to as a child node of node 27. The node 31 may discover the mesh network 10 and one or more nodes 21-30 of the network 10 through various discovery mechanisms, such as by recognizing a beacon message for the network 10 from the node 27, where the beacon message can include a channel hopping sequence used by the network 10. The node 31 requests to join the mesh network 10 by transmitting an association request to its presently selected parent node, node 27.

Figure 2:
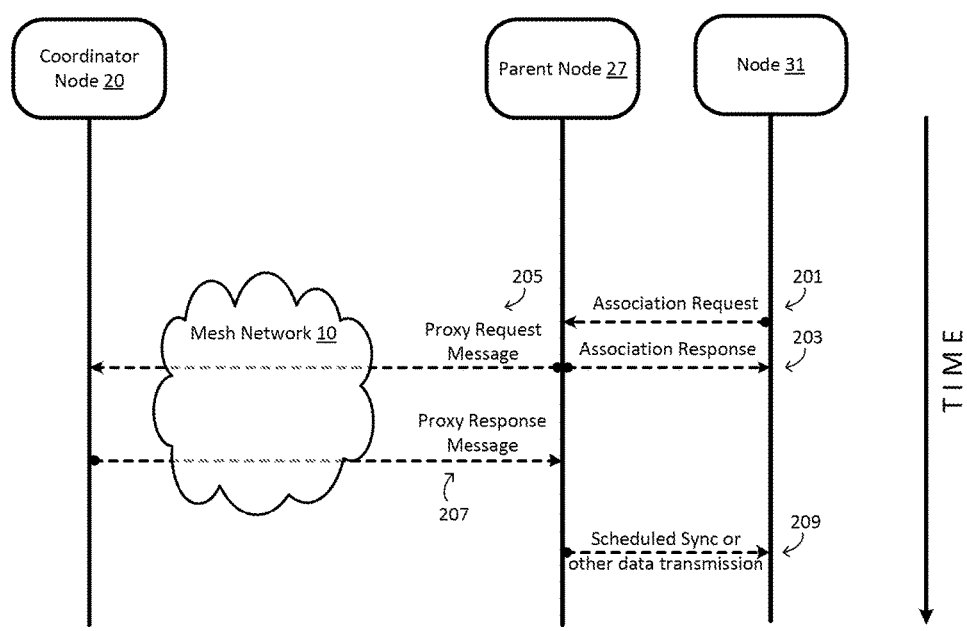
FIGS. 2 and 3 are timing diagrams for nodes in a mesh network according to various embodiments of the present disclosure.

The timing diagram of FIG. 2 illustrates a possible implementation of procedures by which the node 31 can join the network 10 and receive a short address assignment. As shown in FIG. 2, the association request 201 is first sent by the node 31 to the parent node 27. In some implementations, the association request 201 and/or other messages from the node 31 may indicate to the parent node 27 that the node 31 is a battery-powered node. In response, implementations herein allow the parent node 27 to promptly send an association response 203 to the node 31, and also send data from the association request 201 in a proxy request message 205 to the coordinator node 20 for the mesh network 10. In some implementations, the proxy request message 205 can include data identifying the node 31 and its request to join the network 10 (i.e., from the association request 201), while the source address of the proxy request message 205 indicates the parent node 27 is the sender. The association response 203 may include various information, such as an association status that indicates to the node 31 that it has joined the network 10, albeit a "conditional" join while awaiting a response from the coordinator node 20. The association response 203 may further specify periods during which the node 31 should be in an active state in order to send/receive data via the network 10. In various implementations, the node 27 may offer to allow the node 31 to conditionally join the network 10 (i.e., via the association response 203) on the basis of the node 31 being a battery-powered node, though other implementations may not be so limited.

In these implementations, the coordinator node 20 ultimately determines whether the node 31 is allowed to join the network 10. Due to inherent delays and/or retransmissions that may occur, particularly within mesh networks, considerable time may pass until the parent node 27 receives a response from the coordinator node 20 that either accepts or rejects the node's association request made via the proxy request message 205. However, prior to receiving the definitive response from the coordinator node 20, the node 27 can send the association response 203 to the node 31 that allows the node 31 to conditionally join the network 10 while awaiting a response from the coordinator node 20.

By permitting the node 31 to conditionally join the mesh network 10, the node 31 need no longer constantly maintain an active state awaiting a response to its request to join the network 10, thereby allowing the node to enter a low-power "sleep" state shortly afterward. Once in the sleep state, the node 31 will periodically wake to an active state for a "scheduled sync" during which the node 31 may send/receive data before again entering a sleep state, though the node may also enter an active state to send/receive data at times other than during a scheduled sync. At a later time, the parent node 27 receives a proxy response message 207 from the coordinator node 20 in response to the proxy request message 205. The proxy response message 207 indicates definitively whether the node 31 is permitted to join (i.e., unconditionally remain) in the network 10 and possibly other information. In addition, if the node 31 is permitted to join the network 10, the proxy response message 207 may contain a short address to be assigned to the node 31.

After receiving the proxy response message 207, the parent node 27 will notify the node 31 of the response from the coordinator node 20 during the next data transmission 209 sent to the node 31 while it is in an active state, such as during a scheduled sync with the node. In the event the node 31 is permitted to join the network 10, any short address received for the node 31 from the coordinator node 20 is included in the data transmission 209 to the node 31, where the short address may be used by the node 31 on the network 10. Alternatively, in the event the node's request to join the network 10 is denied, the parent node sends a disconnect notification to the node via the data transmission 209. In some implementations, the data transmission 209, which may include a short address, joining status, and/or any other information from the proxy response message 207, is transmitted to the node 31 in an information element (IE) field of a scheduled sync message or other type of message (e.g., an ACK) sent to the node 31. In various implementations, the disconnect notification is sent to the node 31 by specifying a reserved short address (e.g., the hexadecimal address FF:FF) for the node 31, where the reserved address is recognized by nodes as a disconnect notification. In the event that the node 31 receives a disconnect notification, the node 31 may attempt to again join the network 10 via a same or different parent node or may attempt to join another PAN, if such a network is within the radio range of the node 31.

Figure 3:
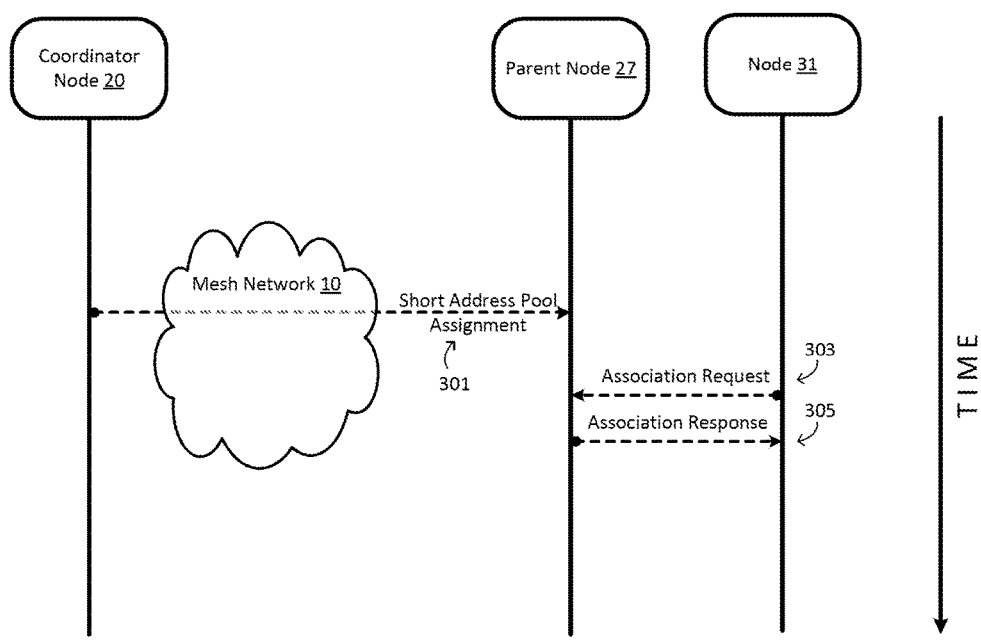

In FIG. 3 a timing diagram is shown for alternate implementations of the procedures by which the node 31 can join the network 10 and receive a short address assignment. Over the course of the time in which the node 27 is a member of the network 10 and capable of serving as a parent node to other nodes, the coordinator node 20 provides the node 27 with a short address pool assignment 301. The short address pool assignment 301 provide the node 27 with a pool of short addresses by which the coordinator node 20 delegates authority to the node 27 to: (i) determine the nodes allowed to unconditionally join the network 10 as child nodes of the node 27, and (ii) assign a short address to those child nodes from its short address pool.

At some later time, the node 31 sends the association request 303 to the node 27, thereby requesting to join the network 10 as a child node of the node 27. In some implementations, the association request 303 and/or other messages from the node 31 may indicate to the parent node 27 that the node 31 is a battery-powered node. In response to receiving the association request 303, the node 27 sends the association response 305 to the node 31. If the node 27 is capable of accommodating the node 31 as a child node, the association response 305 can include various information including a short address assignment for the node 31, an association status that indicates the node 31 has joined the network 10, and/or other possible information. In some implementations, the node 27 informs the coordinator node 20 that the node 31 has joined the network 10, but permission is not sought from the coordinator node 20 for the join. Alternatively, if the node 27 is not capable of accommodating the node 31 as a child node, the association response 305 can include various information including an association status that indicates that the request to join the network 10 is denied. In the event that the node 31 is not permitted to join the network 10, the node 31 may attempt to again join the network 10 via a different parent node or may attempt to join another PAN, if such a network is within the radio range of the node 31.

Figure 4:
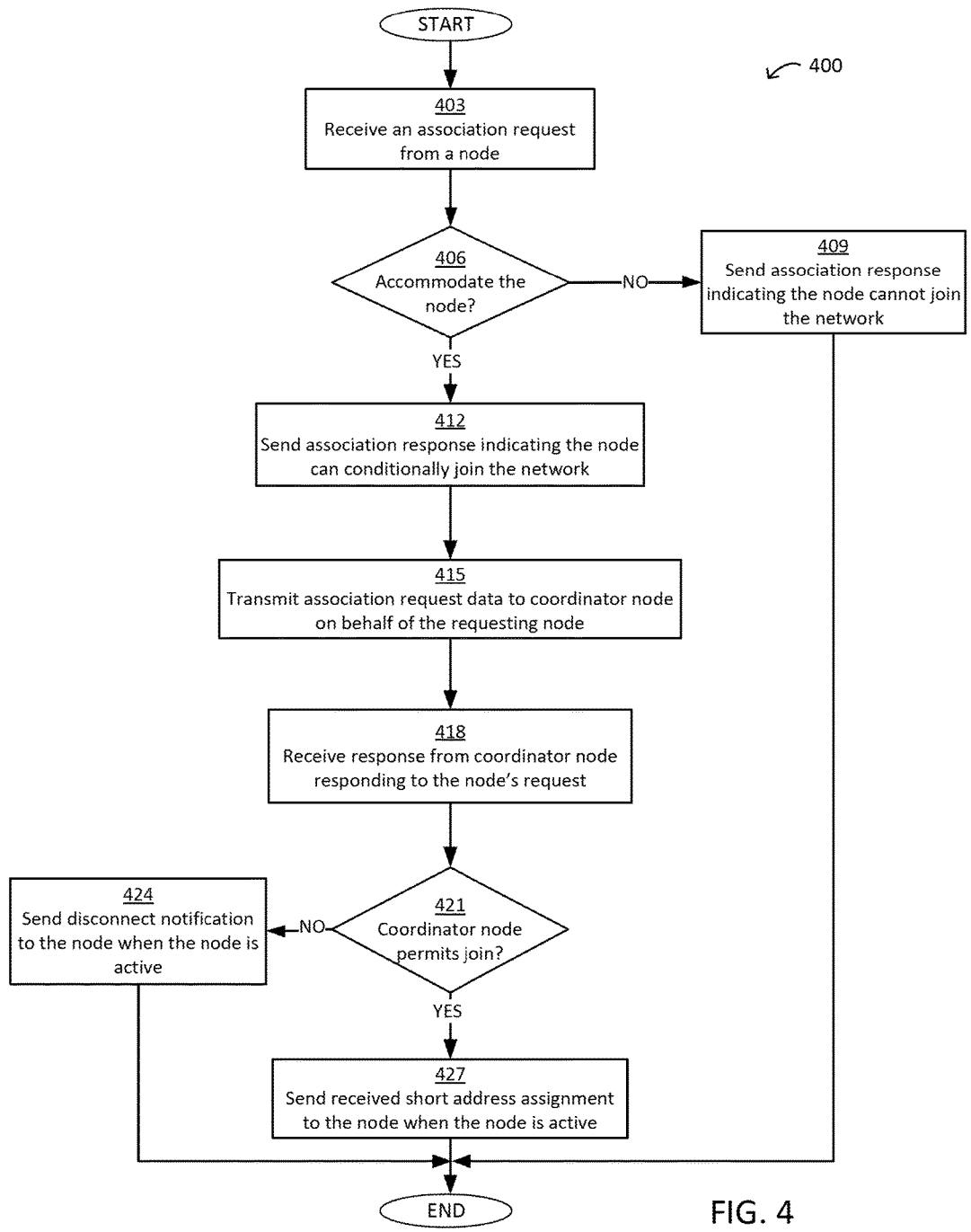
FIG. 4 is a flowchart illustrating one example of functionality implemented by a node in the mesh network of FIG. 1 according to various embodiments of the present disclosure.

Referring next to FIG. 4, shown is a flowchart that provides one example of the network association operations for a method 400 implemented in a node, such as the node 27 (FIG. 1), in the mesh network 10 (FIG. 1) according to various embodiments. It is understood that the flowchart of FIG. 4 provides merely an example of the many different types of functional arrangements that may be employed to implement the network association operations of the method 400 as described herein. The operations depicted in the flowchart of FIG. 4 may be initiated following a transmission of an association request by a node, such as the node 31 (FIG. 1), seeking to join the mesh network 10. For simplicity, the method 400 of FIG. 4 is described below as it may be implemented by node 27 in response to an association request received from node 31. As can be appreciated, the method 400 may be implemented by other nodes in a network.

Beginning with block 403, the node 27 receives an association request from node 31, where the association request is a request for the node 31 to join the mesh network 10. In some implementations, the association request and/or other messages from the node may indicate that the node 31 is a battery-powered node.

Next, in block 406, the node 27 determines whether it can accommodate taking on the node 31 as a child node. The decision may be based upon available computing resources in the node 27, network resources, and/or upon other criteria as can be appreciated. If the node 31 cannot be accommodated as a child node, in block 409, the node 27 sends an association response to the node 31, where the association response includes an association status that indicates that the node 31 cannot join the network 10. Thereafter, this portion of the method 400 ends as shown.

Alternatively, if the node 27 can accommodate the node 31 as a child node, in block 412, the node 27 sends an association response to the node 31 that includes an association status indicating that it has joined the network 10, albeit a conditional join. Although the association response sent to the node 31 may simply indicate that it has joined the network (i.e., without an indication of conditions), the join is conditional since, in these implementations, a coordinator node for the network 10 ultimately makes the definitive determination whether a node can join the network. The association response may further specify periods during which the node 31 should be in an active state in order to send/receive data via the network 10 and/or other possible information. By permitting the node 31 to conditionally join the mesh network 10, the node 31 need no longer constantly maintain an active state awaiting a response to its request to join the network 10, thereby allowing the node to enter a low-power state shortly afterward to conserve energy consumed. Once in the low-power state, the node 31 will periodically wake to an active state for a scheduled sync during which the node 31 may send/receive data before again entering a low-power state, though the node may also enter an active state to send/receive data at times other than during a scheduled sync.

In block 415, the node 27 sends data from the association request, such as a proxy request message 205 (FIG. 2), to the coordinator node for the mesh network 10 seeking to allow the node 31 to unconditionally join the network 10. As discussed above, the coordinator node ultimately determines whether the node 31 is allowed to join the network 10. Due to inherent delays and/or retransmissions that may occur, particularly within mesh networks, considerable time may pass until the node 27 receives a response from the coordinator node that either accepts or rejects the node as part of the network 10. However, as discussed above in block 412, prior to receiving the definitive response from the coordinator node, the node 27 can send the association response to the node 31 that allows the node 31 to conditionally join the network 10 while awaiting a response from the coordinator node 20.

Subsequently, in block 418, the node 27 receives a response, such as a proxy response message 207 (FIG. 2), from the coordinator node in response to the data from the association request sent by the node 27 on behalf of the node 31. In block 421, the node 27 determines whether the coordinator node will allow the node 31 to join (or remain in) the network 10.

If, in block 421, the response from the coordinator node indicates that the node 31 cannot join the network 10 (i.e., the conditional join must end), in block 424, the node 27 sends a disconnect notification to the node 31 via a data transmission sent to the node 31 while it is known to be in an active state. As a corollary, the node 27 may need to wait to send this data transmission until such time as the node 31 is (or has been instructed to be) in an active state. The disconnect notification may be transmitted to the node 31 in an information element (IE) field of a scheduled sync message that occurs at a time in which the node 31 is known to be active. If the node 27 discovers that the node 31 is active prior to the time of the scheduled sync (e.g., the node 27 receives a data packet from the node 31), the node 27 may instead transmit the disconnect notification to the node 31 during this time, such as in an ACK packet or other data packet. In various implementations, the disconnect notification is sent to the node 31 by specifying a reserved short address (e.g., the hexadecimal address FF:FF) for the node 31, where the reserved address is recognized by nodes as a disconnect notification. Thereafter, this portion of the execution of the method 400 ends as shown.

Figure 5:
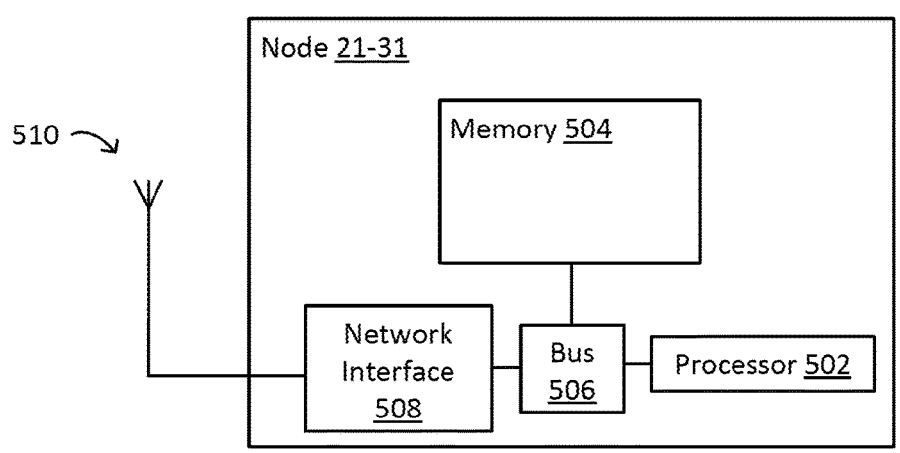
FIG. 5 is a schematic block diagram that provides one example illustration of a node employed in the mesh network of FIG. 1 according to various embodiments of the present disclosure.

Alternatively, if, in block 421, the node 27 determines that the coordinator node permits the node 31 to join the network 10 (i.e., an unconditional join), in block 427, the node 27 sends a "join" notification to the node 31 via a data transmission sent to the node 31 while it is known to be in an active state. As a corollary, the node 27 may need to wait to send this data transmission until such time as the node 31 is (or has been instructed to be) in an active state. In the event that the response from the coordinator node includes a short address assignment for the node 31, the node 27 includes this short address and possibly other information in the join notification to the node 31. The join notification may be transmitted to the node 31 in an IE field of a scheduled sync message that occurs at a time in which the node 31 is known to be active. If the node 27 discovers that the node 31 is active prior to the time of the scheduled sync (e.g., the node 27 receives a data packet from the node 31), the node 27 may instead transmit the join notification to the node 31 during this time, such as in an ACK packet or other data packet. Thereafter, this portion of the execution of the method 400 ends as shown Next, in FIG. 5, shown is a block diagram depicting an example of a node 21-31 used for implementing the techniques disclosed herein within a wireless mesh network or other data network.

The node 21-31 can include a processing device 502. Non-limiting examples of the processing device 502 include a microprocessor, an application-specific integrated circuit ("ASIC"), a state machine, or other suitable processing device. The processing device 502 can include any number of processing devices, including one. The processing device 502 can be communicatively coupled to computer-readable media, such as memory device 504. The processing device 502 can execute computer-executable program instructions and/or access information respectively stored in the memory device 504.

The memory device 504 can store instructions that, when executed by the processing device 502, cause the processing device 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), flash memory, an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The nodes 21-31 can include a bus 506 that can communicatively couple one or more components of the node 21-31. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in a node 21-31 to store and execute programming code.

The nodes 21-31 can also include network interface device 508. The network interface device 508 can be a transceiving device configured to establish a one or more of the wireless communication links via an antenna 510. A non-limiting example of the network interface device 508 is an RF transceiver and can include one or more components for establishing communication links to other nodes 21-31 in the mesh network 10.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for assigning a short address to a node in a network, comprising:
    receiving an association request that is a request from the node to join the network;
    transmitting an association response to the node that permits the node to conditionally join the network and enter a low-power state, wherein the association response further instructs the node to be in an active state during a specified period;
    transmitting data from the association request to a coordinator node for the network on behalf of the node;
    receiving a proxy response from the coordinator node in response to the data from the association request, the proxy response including a response to the request from the node to join the network; and
    subsequent to said receiving the proxy response and during the period in which the node is instructed to be in the active state, transmitting a notification to the node based on the response to the request, the notification including an assignment of the short address for the node when the response indicates that the coordinator node acknowledged the node's joinder.

2. The method of claim 1, wherein the notification includes a disconnect notification for the node when the response indicates that the coordinator node denies the request from the node to join the network, the disconnect notification ending the conditional join to the network.

3. The method of claim 2, wherein the disconnect notification is specified using a reserved short address that indicates the node should disconnect from the network.

4. The method of claim 1, further comprising waiting for a scheduled sync with the node prior to said transmitting the notification to the node, wherein the node is in the active state to perform the scheduled sync.

5. The method of claim 1, wherein said transmitting the notification during the period in which the node is instructed to be in the active state occurs when no data packet has been received from the node subsequent to said receiving the proxy response.

6. The method of claim 1, wherein the network is defined by Institute of Electrical and Electronics Engineers (IEEE) 802.15.4e.

7. The method of claim 1, further comprising detecting the node is battery-powered, wherein said transmitting the association response to the node permitting the node to conditionally join the network occurs in response to said detecting the node is battery-powered.

8. A non-transitory computer-readable medium embodying a program executable in a first node device of a network, comprising:
    code that receives an association request that is a request from a second node device to join the network;
    code that transmits an association response to the second node device that permits the second node device to conditionally join the network and enter a low-power state, wherein the association response further instructs the second node device to be in an active state during a specified period;
    code that transmits data from the association request to a coordinator node device for the network on behalf of the second node device;
    code that receives a proxy response from the coordinator node device in response to the data from the association request, the proxy response including a response to the request from the second node device to join the network; and
    code that, subsequent to said receiving the proxy response and during the period in which the second node device is instructed to be in the active state, transmits a notification to the second node device based on the response to the request, the notification including an assignment of a short address for the second node device when the response indicates that the coordinator node device acknowledged the second node device's joinder.

9. The non-transitory computer-readable medium of claim 8, wherein the notification includes a disconnect notification for the second node device when the response indicates that the coordinator node device denies the request from the second node device to join the network, the disconnect notification ending the conditional join to the network.

10. The non-transitory computer-readable medium of claim 9, wherein the disconnect notification is specified using a reserved short address that indicates the second node device should disconnect from the network.

11. The non-transitory computer-readable medium of claim 8, wherein the network is a mesh network defined by Institute of Electrical and Electronics Engineers (IEEE) 802.15.4e.

12. The non-transitory computer-readable medium of claim 8, further comprising code that waits for a scheduled sync with the second node device prior to said transmitting the notification to the second node device, wherein the second node device is in the active state to perform the scheduled sync.

13. The non-transitory computer-readable medium of claim 8, wherein the first node device is also a parent node to a third node device in the network.

14. A first node, comprising:
    a processor;
    a network interface for communicating on a network; and
    a memory configured by code executed in the first node, the code causing the first node to:
        receive an association request that is a request from a second node to join the network;
        transmit an association response to the second node that permits the second node to conditionally join the network and enter a low-power state, wherein the association response further instructs the second node to be in an active state during a specified period;
        transmit data from the association request to a coordinator node for the network on behalf of the second node;
        receive a proxy response from the coordinator node in response to the data from the association request, the proxy response including a response to the request from the second node to join the network; and
        subsequent to said receiving the proxy response and during the period in which the second node is instructed to be in the active state, transmit a notification to the second node based on the response to the request, the notification including an assignment of a short address for the second node when the response indicates that the coordinator node acknowledged the second node's joinder.

15. The first node of claim 14, wherein the notification includes a disconnect notification for the second node when the response indicates that the coordinator node denies the request from the second node to join the network, the disconnect notification ending the conditional join to the network.

16. The first node of claim 15, wherein the disconnect notification is specified using a reserved short address that indicates the second node should disconnect from the network.

17. The first node of claim 14, further comprising detecting the second node is battery-powered, wherein said transmitting the association response to the second node permitting the second node to conditionally join the network occurs in response to said detecting the second node is battery-powered.

18. The first node of claim 14, further comprising waiting for a scheduled sync with the second node prior to said transmitting the notification to the second node, wherein the second node is in the active state to perform the scheduled sync.

19. The first node of claim 14, wherein the network is a time synchronous channel hopping (TSCH) network.

20. The first node of claim 14, wherein said transmitting the notification during the period in which the second node is instructed to be in the active state occurs when no data packet has been received from the second node subsequent to said receiving the proxy response.

\* \* \* \* \*